3,118,937
4,4'-BIS-BIGUANIDOSTILBENEDISULFONAMIDES
Adrian Marxer, Muttenz, Switzerland, assignor to Ciba Corporation, a corporation of Delaware
No Drawing. Filed June 8, 1960, Ser. No. 34,620
Claims priority, application Switzerland June 16, 1959
5 Claims. (Cl. 260—556)

The present invention provides as new products 4-biguanido-diphenyl compounds which contain in the 4'-position an amino group or a further biguanido group and in which the benzene nuclei are linked together by a divalent lower aliphatic hydrocarbon radical, as well as of their salts and processes for preparing same. The new compounds may be further substituted, for example in the phenyl nuclei by lower alkyl or alkoxy groups or halogen atoms, above all by sulfonamido groups or at the nitrogen atoms, especially the terminal nitrogen atoms of the biguanido group, for example by lower alkyl or cycloalkyl radicals, such as methyl, ethyl, propyl, isopropyl, butyl, secondary butyl, pentyl, isopentyl, cyclopentyl, or cyclohexyl groups. The lower divalent aliphatic hydrocarbon radical which links the two benzene nuclei contains advantageously at most 3 carbon atoms and is preferably a lower alkylene radical, for example, a methylene or ethylene radical, or an alkenylene radical, such as an ethenylene, alkylidene or alkenylidene radical.

The new compounds have valuable chemotherapeutic properties. Inter alia, they are active against microorganisms and viruses, more especially protozoa, primarily trypanosomas, and are thus intended to be used as medicaments. Thus they can be used in infectious diseases caused by trypanosomas.

Of special value are 4:4'-bis-biguanido-stilbene compounds that are substituted by a sulfonamido group in each of the two benzene nuclei, preferably in 2:2'-position, above all the 4:4'-bis-biguanido-stilbene-2:2'-disulfonamide of the formula

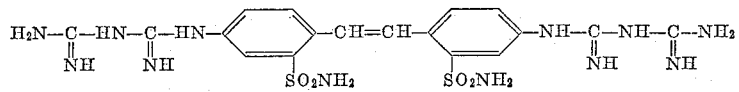

as well as the salts thereof.

The new compounds are obtained when in an as such known manner in a 4-R-diphenyl compound or a salt thereof, in which R represents an amino group containing hydrogen, and which contains in the 4'-position an amino group or a substituent convertible into an amino group and in which the benzene nuclei are linked by a lower divalent aliphatic hydrocarbon radical, at least one of its amino groups containing hydrogen is converted into a biguanido group, a substituent in the 4'-position which is convertible into an amino group is so converted and, if desired, a resulting amino group containing hydrogen is converted into a biguanido group.

A radical convertible into an amino group is for example one which can be converted into such a group by hydrolysis or reduction, above all an acylamino, nitro, diazo, azo or azoxy group. The conversion is performed in per se conventional manner. Amino groups containing hydrogen are primarily free or monosubstituted, such as mono-lower alkylated, amino groups.

The conversion of the amino group into a biguanido group is carried out, e.g., in a direct way, advantageously by reacting the free amine or a salt thereof with dicyandiamide or a substituted, for example alkylated, dicyandiamide.

Thus, a 4:4'-diaminostilbene, in which the two benzene nuclei are substituted by a sulfonamido group each, or a mono-salt or bis-salt thereof, can be reacted with dicyandiamide, whereby according to the individual conditions the mono- or bis-guanido compounds or their salts are obtained.

A preferred embodiment of the indirect conversion of an amino group into a biguanido group consists in the diazotization of the amino group, coupling of the diazonium salt with dicyandiamide, e.g., in aqueous alkali carbonate solution, decomposing the coupling product, e.g., with gaseous hydrochloric acid and treatment with hot water, and additive combination of ammonia or primary or secondary amines with the cyanguanido group so formed.

The reactions are performed in the known manner in the presence or absence of diluents and/or condensing agents and/or catalysts, at the ordinary or a raised temperature, under atmospheric or superatmospheric pressure.

It is of advantage to perform the reactions in solution, for example in water or an alcohol, such as methanol, ethanol, propanol, isopropanol, a butanol, an amyl alcohol, ethylene glycol or a lower alkyl ether or mixtures thereof, or in a weak organic base such as pyridine or dimethylaniline.

When dicyandiamide is used, a useful condensing agent is an acid, more especially a strong inorganic acid, such as hydrochloric acid or complex-forming metal salts, e.g., copper-II-salts. When the solvent used is a weak organic base, it is of advantage to use as condensing agent a salt of such compound with a strong acid, for example pyridine hydrochloride or dimethylaniline hydrochloride. Resulting complexes can be split up in the usual manner, copper complexes, for example by means of hydrogen sulfide in acid solution.

The bis-biguanido compounds are advantageously prepared from bis-salts of the diamino compounds by reacting such a salt with 2 or more molecular proportions of dicyandiamide. The mono-biguanido compounds are preferably prepared from mono-salts of the diamino compounds by reaction with the calculated proportion of dicyandiamide; when the reaction product is then further reacted with a dicyandiamide, the bis-biguanido derivative is obtained.

Nitrogen atoms capable of substitution, present in the resulting compounds, can be further substituted in the conventional manner, for example they may be lower-alkylated.

The invention further includes any modification of the present process in which an intermediate obtained at any stage of the process is used as starting material and the remaining step or steps are carried out, or the process is discontinued at any stage thereof.

According to the reaction conditions employed the new compounds are obtained in the form of the free bases or of the salts thereof. From the salts of the free bases the bases can be obtained in the known manner, and free bases can be converted into salts by known methods. Therapeutically useful salts can be formed with inorganic acids, such as the hydrohalic acids, sulfuric acids, nitric acid, phosphoric acids, thiocyanic acid, or organic acids such, for example, as acetic acid, propionic acid, oxalic, malonic, succinic, tartaric, malic acid, methanesulfonic acid, ethanesulfonic acid, hydroxy-ethanesulfonic acid, benzenesulfonic or toluenesulfonic acid, or therapeutically useful acids.

The starting materials are known or can be made by known processes, if desired in the course of the reaction. Preferred starting materials are those which yield the compounds specifically mentioned hereinbefore as being particularly valuable.

The new compounds can be used as medicaments, for example in the form of pharmaceutical preparations containing them or their salts in admixture with a pharmaceutical organic or inorganic excipient suitable for enteral or parenteral administration. Such excipients can be made from substances that do not react with the new compounds, such as water, gelatine, lactose, starches, magnesium stearate, talc, vegetable oils, benzyl alcohols, gums, polyalkylene glycols or other known pharmaceutical excipients. The pharmaceutical preparations may be, for example, tablets or dragees, or in liquid form solutions, suspensions or emulsions. They may be sterilized and/or may contain assistants such as preserving, stabilizing, wetting or emulsifying agents, salts for regulating the osmotic pressure, or buffers. They may also contain further therapeutically valuable substances. The preparations are formulated by the conventional methods.

The following examples illustrate the invention.

*Example 1*

A suspension of 18.4 grams of 4:4'-diaminostilbene-2:2'-disulfonamide in 75 cc. of water is mixed with 17 cc. of 6.04 N-hydrochloric acid and then with 8.4 grams of $$H_2N-C-HN-C-HN-\langle\rangle-CH=CH-\langle\rangle-NH-C-NH-C-NH_2 \cdot 2HCl$$
$$\phantom{H_2N-C-}\|\phantom{HN-C-}\|\phantom{HN-\langle\rangle-CH=CH-\langle\rangle-NH-}\|\phantom{-NH-}\|$$
$$\phantom{H_2N-C-}NH\phantom{-}NH\phantom{HN-\langle\rangle-CH=CH-\langle\rangle-NH-}NH\phantom{-NH-}NH$$

dicyandiamide, and the mixture is refluxed with stirring for 7 hours. After the starting materials have passed into solution, the product crystallizes out; it is allowed to cool, suctioned off and washed with a small amount of water. The residue is extracted by being boiled with 200 cc. of alcohol, and the insoluble matter is once again removed.

In this manner the dihydrochloride of 4:4'-bis-biguanidostilbene-2:2'-disulfonamide of the formula $$H_2N-C-HN-C-HN-\langle\rangle-CH=CH-\langle\rangle-NH-C-NH-C-NH_2 \cdot 2HCl$$
$$\phantom{xx}SO_2NH_2\phantom{xxxx}SO_2NH_2$$

is obtained. It melts at 292° C. with decomposition, gives a clear solution in water, and can be precipitated in the form of the base with sodium carbonate.

The 4:4'-diaminostilbene-2:2'-disulfonamide, used as starting material, can be prepared by reducing 4:4'-dinitrostilbene-2:2'-disulfonamide with zinc dust in alcoholic glacial acetic acid. It melts at 274–278° C. The 4,4'-dinitrostilbene-2,2'-disulfonamide is obtained by boiling 4,4'-dinitro-stilbene-2,2'-disulfonic acid with phosphorus oxychloride, pouring the reaction mixture on ice and adding a concentrated aqueous solution of ammonia.

*Example 2*

A suspension of 10.51 grams of 4:4'-diaminostilbene in 55 cc. of N-hydrochloric acid and 50 cc. of water is treated with 4.2 grams of dicyandiamide. The mixture is heated with stirring for 4 hours on an oil bath at 130° C. The resulting, thick magma is extracted by being boiled with 700 cc. of water, a small amount of insoluble matter is filtered off the hot reaction mixture, and the filtrate is treated with alcohol and reduced to a small volume under diminished pressure. The resulting solid substance is suctioned off and washed with alcohol.

The resulting 4-amino-4'-biguanido-stilbene hydrochloride melts unsharply at about 300° C.; it corresponds to the formula $$H_2N-\langle\rangle-CH=CH-\langle\rangle-NH-C-NH-C-NH_2 \cdot HCl$$
$$\phantom{xxxxxxxxxxxxxxxxxxxxxxxx}\|\phantom{xx}\|$$
$$\phantom{xxxxxxxxxxxxxxxxxxxxxxxx}NH\phantom{x}NH$$

*Example 3*

A mixture of 10.51 grams of 4:4'-diaminostilbene, 8.6 grams of dicyandiamide and 200 cc. of 0.5 N-hydrochloric acid is stirred for 11 hours under reflux. The resulting crystallizate is isolated and boiled with 1.5 liters of water. The slightly turbid filtrate is filtered, boiled for a short time with a small amount of active carbon and again filtered. The clear solution is evaporated under reduced pressure until crystallization sets in. The resulting 4:4'-bis-biguanidostilbene dihydrochloride of the formula $$H_2N-C-NH-C-NH-\langle\rangle-CH=CH-\langle\rangle-NH-C-NH-C-NH_2 \cdot 2HCl$$

melts at 174–177° C.

What is claimed is:

1. A member selected from the group consisting of a 4-biguanido-stilbene compound of the formula:

$$R-\langle\rangle-CH=CH-\langle\rangle-NH-C-NH-C-NH_2$$
$$\phantom{xx}SO_2NH_2\phantom{xxxx}SO_2NH_2\phantom{xxxx}NH\phantom{x}NH$$

wherein R represents a member selected from the group consisting of amino and biguanido, and an addition salt thereof with a therapeutically acceptable acid.

2. A 4,4'-bis-biguanido-stilbene compound of the formula:

$$H_2N-C-NH-C-NH-\langle\rangle-CH=CH-\langle\rangle-NH-C-NH-C-NH_2$$
$$\phantom{xxxxxxxxxx}SO_2NH_2\phantom{xxxx}SO_2NH_2$$

3. An addition salt of a 4,4'-bis-biguanido-stilbene compound of the formula:

$$H_2N-C-NH-C-NH-\langle\rangle-CH=CH-\langle\rangle-NH-C-NH-C-NH_2$$
$$\phantom{xxxxxxxxxx}SO_2NH_2\phantom{xxxx}SO_2NH_2$$

with a therapeutically acceptable acid.

4. An addition salt of 4,4'-bis-biguanido-stilbene-2,2'-disulfonamide with a pharmaceutically acceptable acid.

5. 4,4'-Bis-biguanido-stilbene-2,2'-disulfonamide.

References Cited in the file of this patent

UNITED STATES PATENTS

| | | |
|---|---|---|
| 2,255,090 | Tinker et al. | Sept. 9, 1941 |
| 2,331,377 | D'Alelio | Oct. 12, 1943 |
| 2,901,477 | Siegel et al. | Aug. 25, 1959 |

OTHER REFERENCES

Rey et al.: C.A., vol. 45, page 8487 (1951).